United States Patent
Brumbaugh (10) Patent No.: US 7,299,562 B2
(45) Date of Patent: Nov. 27, 2007

(54) DEVICE AND METHOD FOR MOUNTING A POSITION MEASURING DEVICE ONTO A MACHINE TOOL, AND POSITION MEASURING SYSTEM

(75) Inventor: Michael Brumbaugh, Jamestown, NY (US)

(73) Assignee: Acu-Rite Companies, Inc., Jamestown, NY (US)

( * ) Notice: Subject to any disclaimer, the term of this patent is extended or adjusted under 35 U.S.C. 154(b) by 140 days.

(21) Appl. No.: 11/233,594

(22) Filed: Sep. 22, 2005

(65) Prior Publication Data

US 2007/0063114 A1    Mar. 22, 2007

(51) Int. Cl.
   *G01B 5/24* (2006.01)
(52) U.S. Cl. ........................................ 33/613
(58) Field of Classification Search ................ 33/613, 33/645, 702, 703, 706–708
   See application file for complete search history.

(56) References Cited

U.S. PATENT DOCUMENTS

| | | | | |
|---|---|---|---|---|
| 4,479,304 A | * | 10/1984 | Nelle | 33/700 |
| 4,530,157 A | * | 7/1985 | Nelle | 33/707 |
| 5,016,359 A | * | 5/1991 | Nagaoka et al. | 33/702 |
| 5,655,311 A | * | 8/1997 | Affa | 33/706 |
| 6,092,296 A | * | 7/2000 | Nelle | 33/706 |
| 6,119,357 A | * | 9/2000 | Ochiai et al. | 33/708 |
| 6,598,309 B1 | * | 7/2003 | Coombs | 33/645 |
| 6,820,348 B2 | | 11/2004 | Brumbaugh | 33/613 |
| 2002/0112360 A1 | * | 8/2002 | Brumbaugh | 33/613 |
| 2005/0028394 A1 | | 2/2005 | Brumbaugh | 33/613 |

FOREIGN PATENT DOCUMENTS

| | | |
|---|---|---|
| EP | 1 462 758 | 9/2004 |
| WO | WO 85/05544 | 12/1985 |

* cited by examiner

*Primary Examiner*—G. Bradley Bennett
(74) *Attorney, Agent, or Firm*—Kenyon & Kenyon LLP (57) ABSTRACT

A device for mounting a position measuring device onto a machine tool includes at least one hanger tool, e.g., two hanger tools. Each hanger tool includes: a bracket detachably attachable to a housing of the position measuring device, e.g., at a respective end of the position measuring device; a mounting plate detachably attachable to a machine surface of the machine tool; and an adjustment device adapted to adjust a distance between the bracket and the mounting plate.

42 Claims, 8 Drawing Sheets

DEVICE AND METHOD FOR MOUNTING A POSITION MEASURING DEVICE ONTO A MACHINE TOOL, AND POSITION MEASURING SYSTEM

FIELD OF THE INVENTION

The present invention relates to a device and method for mounting a position measuring device, e.g., a linear encoder, onto a machine tool, and to a position measuring system.

BACKGROUND INFORMATION

One or more axes of a manually-operated machine tool may be retrofitted with a linear encoder. The linear encoder generates position dependent output signals so that the machine tools can be operated as numerically controlled machines.

A method for mounting a linear encoder on a milling machine or mill involves holding the encoder in place on a surface of the mill while marking a mounting hole location on one end of the encoder on the mill. The encoder is then removed and a hole is drilled at the marked hole location. One end of the encoder is then attached to the mill the hole location and secured in place. To do this properly, the fastener is centered in the encoder mounting hole so that a maximum clearance is kept available for the encoder alignment procedure. The encoder is next aligned to the machine travel while being held by hand at the unsecured end. The mounting hole at the unsecured end of the encoder is then marked on the mill. The encoder is then removed again from the mill and the mounting hole on the other end is drilled. Finally, the encoder is reattached to the mill again and realigned.

Longer length encoders that have a center support require that the support be aligned to the encoder ends. The hole location for the support is then machined by either first removing the encoder or covering the entire encoder to prevent chips or other debris from lodging between the encoder and the mill, which may cause misalignment. The center support is then installed and aligned to the top of the encoder end.

U.S. Pat. No. 6,820,348 and U.S. Patent Application Publication No. 2005/0028394 describe methods for mounting an encoder on a machine tool and also describe a mounting tool for facilitating the hanging of an encoder on a machine tool. While the tool reduces the number of steps required to attach an encoder to a machine tool as compared to manual methods that may have been used prior to the development of the tool, a need is believed to exist to further facilitate the mounting process of an encoder or spar to a machine tool.

Each of U.S. Pat. No. 6,820,348 and U.S. Patent Application Publication No. 2005/0028394 is expressly incorporated herein in its entirety by reference thereto.

SUMMARY

According to an example embodiment of the present invention, a device for mounting a position measuring device onto a machine tool includes at least one hanger tool. The hanger tool includes: a bracket detachably attachable to a housing of the position measuring device; a mounting plate detachably attachable to a machine surface of the machine tool; and an adjustment device adapted to adjust a distance between the bracket and the mounting plate.

The mounting plate may be at least partially magnetized.

The position measuring device may include a linear encoder.

The device may include a securing device adapted to secure the bracket to the housing of the position measuring device.

The mounting plate may be disposed at an angle to a longitudinal axis of the adjustment device.

The bracket may include a first threaded member, and the adjustment device may include a second threaded member engageable with the first threaded member. Relative rotation of the first threaded member and the second threaded member may adjust the distance between the bracket and the mounting plate.

The first threaded member may be externally threaded, and the second threaded member may be internally threaded.

The second threaded member may be externally threaded, and the first threaded member may be internally threaded.

The second threaded member may be rotatable received in a bore in the mounting plate.

The mounting plate may include a lock screw adapted to lock the second threaded member against rotation relative to the mounting plate.

The at least one hanger tool may include two hanger tools, and the bracket of each hanger tool may be detachably attachable to the housing of the position measuring device at a respective end of the position measuring device.

According to an example embodiment of the present invention, a device for mounting a position measuring device onto a machine tool includes: a spar attachable to the machine tool and to the position measuring device; and at least one hanger tool. The at least one hanger tool includes: a mounting plate detachably attachable to a machine surface of the machine tool; and an adjustment device adapted to adjust a distance between the spar and the mounting plate.

The spar may include a threaded hole corresponding to each hanger tool, and the adjustment device may include a threaded member engageable with the threaded hole. Rotation of the threaded member relative to the threaded hole may adjust the distance between the spar and the mounting plate.

The threaded member may be rotatable received in an unthreaded bore in the mounting plate.

The mounting plate may include a lock screw adapted to lock the threaded member against rotation relative to the mounting plate.

The at least one hanger tool may include two hanger tools, and the threaded holes may be located at each end of the spar.

According to an example embodiment of the present invention, a method for mounting a position measuring device onto a machine tool includes: (a) attaching a bracket of at least one hanger tool onto a housing of the position measuring device; (b) attaching a mounting plate of each hanger tool to a machine surface of the machine tool; (c) after the attaching step (a) and the attaching step (b), aligning an axis of the position measuring device to an axis of the machine tool by adjusting an adjustment device of the hanger tool; (d) after the aligning step (c), marking, on the machine tool, locations of mounting holes for the position measuring device; (e) after the marking step (d), removing the position measuring device and the hanger tool from the machine tool without detachment of the bracket from the housing of the position measuring device; (f) after the removing step (e), machining the mounting holes on the machine tool; (g) after the machining step (f), reattaching the position measuring device and the hanger tool attached to each other to the machine tool; (h) after the reattaching step (g), mounting the position measuring device to the machine tool by the mounting holes; and (i) after the mounting step (h), detaching the hanger tool from the housing of the position measuring device.

The at least one hanger tool may include two hanger tools, and the attaching step (a) may include attaching the bracket of a respective one of the two hanger tools onto the housing of the position measuring device at each end of the position measuring device.

According to an example embodiment of the present invention, a method for mounting a position measuring device onto a machine tool includes: (a) attaching at least one hanger tool onto a spar; (b) attaching a mounting plate of each hanger tool to a machine surface of the machine tool; (c) after the attaching step (a) and the attaching step (b), aligning an axis of the spar to an axis of the machine tool by adjusting an adjustment device of the hanger tool; (d) after the aligning step (c), marking, on the machine tool, locations of mounting holes for the spar; (e) after the marking step (d), removing the spar and the hanger tool from the machine tool without detachment of the hanger tool from the spar; (f) after the removing step (e), machining the mounting holes on the machine tool; (g) after the machining step (f), reattaching the spar and the hanger tool attached to each other to the machine tool; (h) after the reattaching step (g), mounting the spar to the machine tool by the mounting holes; (i) after the mounting step (h), detaching the hanger tool from the spar; and (j) after the detaching step (i), attaching the position measuring device to the spar.

The at least one hanger tool may include two hanger tools, and the attaching step (a) may include attaching a respective one of the two hanger tools onto the spar at each end of the spar.

According to an example embodiment of the present invention, a system includes: a position measuring device mountable onto a machine tool; and a device adapted to mount the position measuring device onto the machine tool. The device includes at least one hanger tool, which includes: a bracket detachably attachable to a housing of the position measuring device; a mounting plate detachably attachable to a machine surface of the machine tool; and an adjustment device adapted to adjust a distance between the bracket and the mounting plate.

The at least one hanger tool may include two hanger tools, and the bracket of each hanger tool may be detachably attachable to the housing of the position measuring device at a respective end of the position measuring device.

According to an example embodiment of the present invention, a system includes: a position measuring device; a spar adapted to mount the position measuring device onto a machine tool; and a device adapted to mount the spar onto the position measuring device. The device includes at least one hanger tool, which includes: a mounting plate detachably attachable to a machine surface of the machine tool; and an adjustment device adapted to adjust a distance between the spar and the mounting plate.

Example embodiments of the present invention are described in more detail below with reference to the appended Figures.

DETAILED DESCRIPTION

Figure 1:
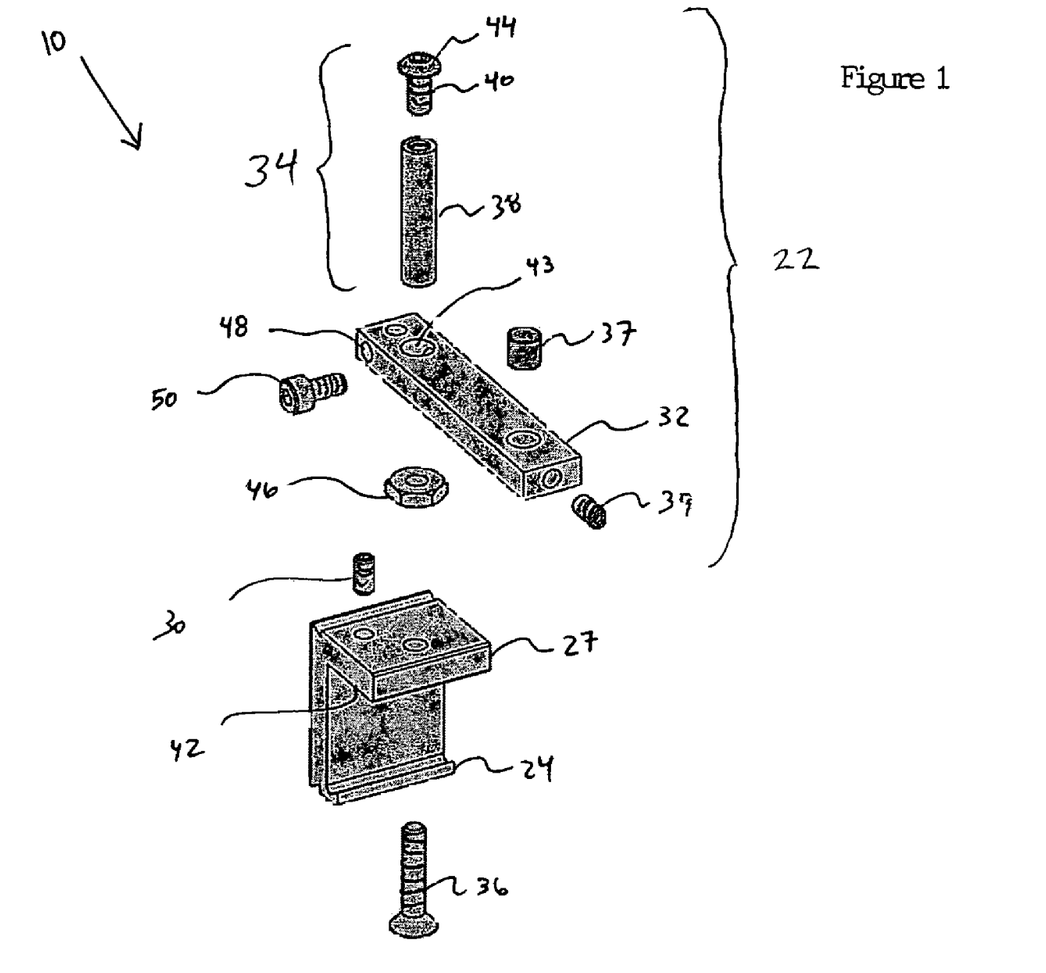
FIG. 1 is an exploded view of a hanger tool of an exemplary embodiment of the present invention.
Figure 2:
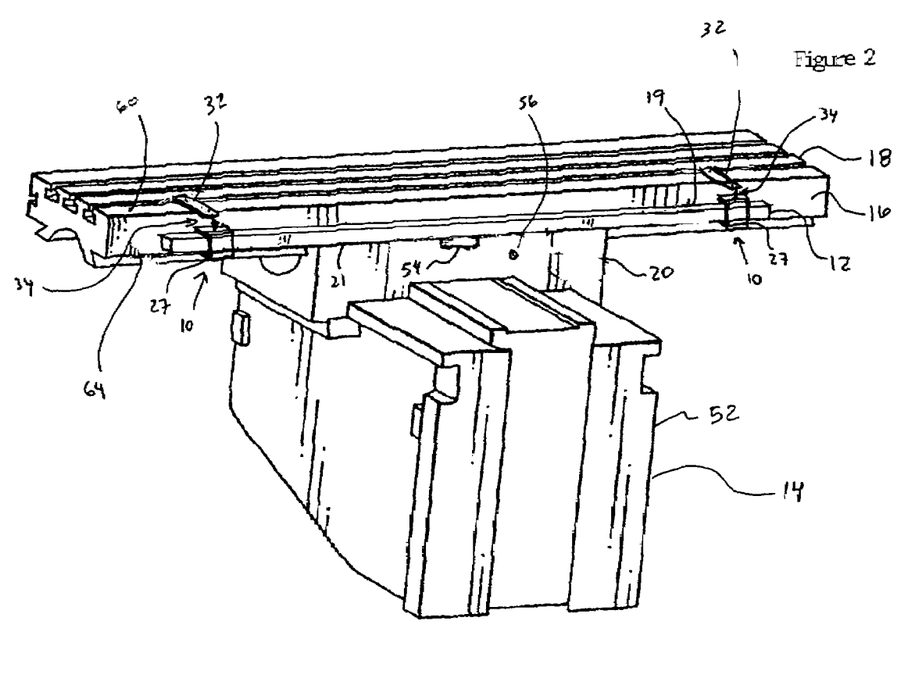
FIG. 2 is a perspective view of a pair of hanger tools connected to a linear encoder mounted on a side of a mill table.
Figure 3:
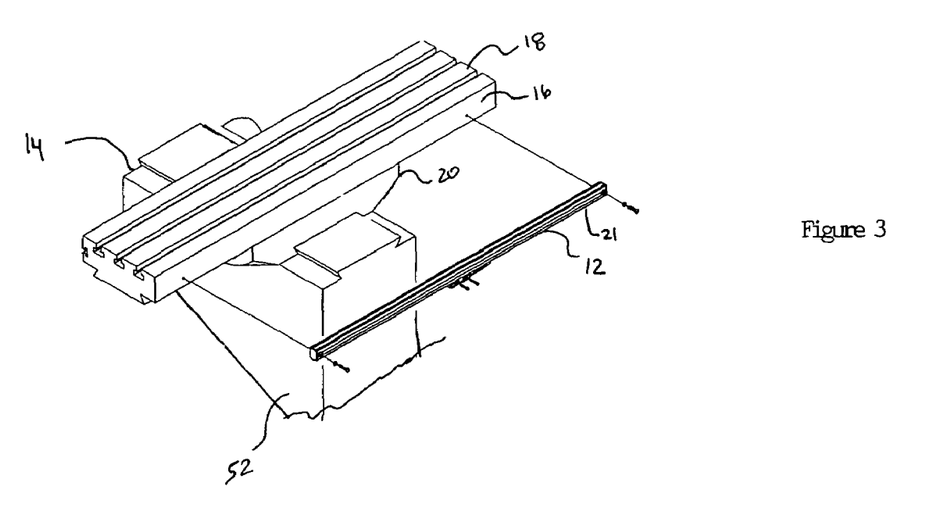
FIG. 3 is a perspective view of a linear encoder and a mill with a saddle having a knee with dovetail ways.

FIG. 1 is an exploded view of a hanger tool 10 according to an example embodiment of the present invention for mounting a position measuring device, such as a linear encoder 12, on a machine tool, such as a milling machine or mill 14. FIG. 2 illustrates a pair of hanger tools 10 and the linear encoder 12 mounted in the x-direction on a mill table 18. The hanger tool 10 is used to facilitate mounting of the encoder 12 on a side 16 of a mill table 18, as illustrated in FIG. 3. Encoder 12 is used to track the position of table 18 relative to saddle 20.

While FIG. 2 illustrates a pair of hanger tools 10, it should be appreciated that any number of hanger tools 10 may be provided, depending, e.g., on the length of the encoder 12, etc. For example, a single hanger tool 10 may be provided or more than two hanger tools 10 may be provided.

As illustrated in FIG. 1, hanger tool 10 may include a connector 22 and a hanger or bracket 27. The bracket 27 may releasably connect to the encoder 12 such that a lower arm 24 of the bracket 27 engages a recess 28 (see, e.g., FIG. 8) on an underside 21 of encoder 12. The bracket 27 may be configured to support and at least partially wrap around the encoder 12. A locking mechanism, such as a locking set screw 30, may engage, for example, a top 19 of the encoder 12 so as to lock the encoder 12 in the bracket 27.

While FIG. 1 illustrates that a hanger tool 10 may include a single connector 22 and a single hanger or bracket 27, it should be appreciated that a hanger tool 10 may include a single hanger or bracket 27 with one or more connectors 22. For example, a single hanger or bracket 27 may span substantially an entire length of the encoder 12, or at least a sufficient length of the encoder 12 that the encoder 12 is adequately stable when attached to the machine tool 14 by the hanger tool 10, with a respective connector 22 arranged at or near each end of the hanger or bracket 27 and/or arranged at or near the center of the hanger or bracket 27.

The connector 22 may include a mounting plate 32 and height adjustable connector 34 between the mounting plate 32 and the bracket 27. Mounting plate 32 may be magnetic and may include a removable magnet 37 secured in a corresponding bore in the mounting plate 32 by, for example, using a screw 39. Height adjustable connector 34 may include a first threaded member, such as a first screw 36, an internally threaded sleeve 38 and a second threaded member, such as second screw 40. First screw 36 may be screwed into an upper arm 42 of bracket 27 and one end of sleeve 38. Sleeve 38 may pass through a first hole 43 in mounting plate 32 and may be screwed on first screw 36. The diameter of head 44 of second screw 40 may be larger than a diameter of first hole 43. The second screw 40 prevents sleeve from falling through first hole 43 when the hanger tool 10 is mounted on the mill 14. Rotation of sleeve 38 together with second screw 40 relative to first screw 36 changes the height of the connector 34, which changes a distance between bracket 27 and mounting plate 32. A lock nut 46 screwed on first screw 36 may be tightened against sleeve 38 so as to lock the position of the first screw 36 and the sleeve 38. The mounting plate 32 may include an internally threaded second hole 48, which may communicate with the first hole 43. A third screw 50 may be screwed into second hole 48 so as to lock the position of sleeve 38 relative to the mounting plate 32.

Height adjustable connector 34 may be replaced with other conventional mechanisms used for height adjustment. For example, as described in U.S. Pat. No. 6,820,348 and U.S. Patent Application Publication No. 2005/0028394, each of which is expressly incorporated herein in its entirety by reference thereto, a pair of telescopically received legs and a threaded control cylinder may be used to adjust the distance between the bracket 27 and the mounting plate 32.

Figure 4:
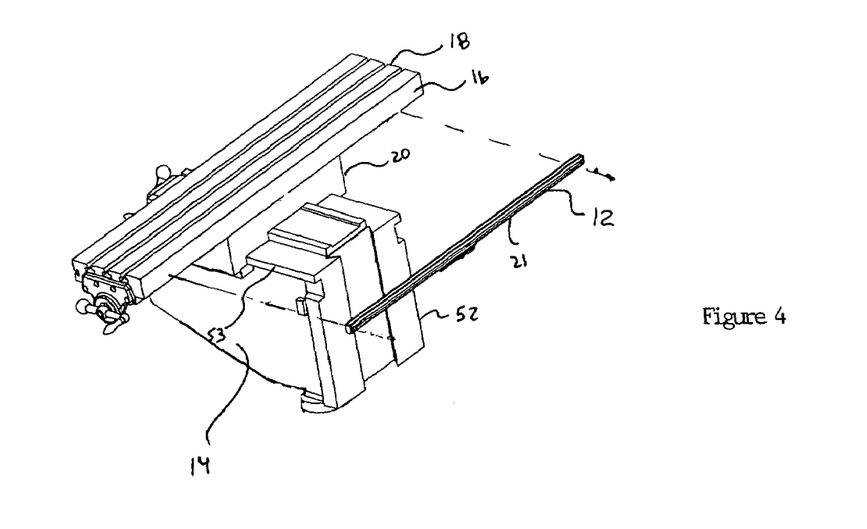
FIG. 4 is a perspective view of a linear encoder and a mill with a saddle having a knee with square ways.
Figure 5:
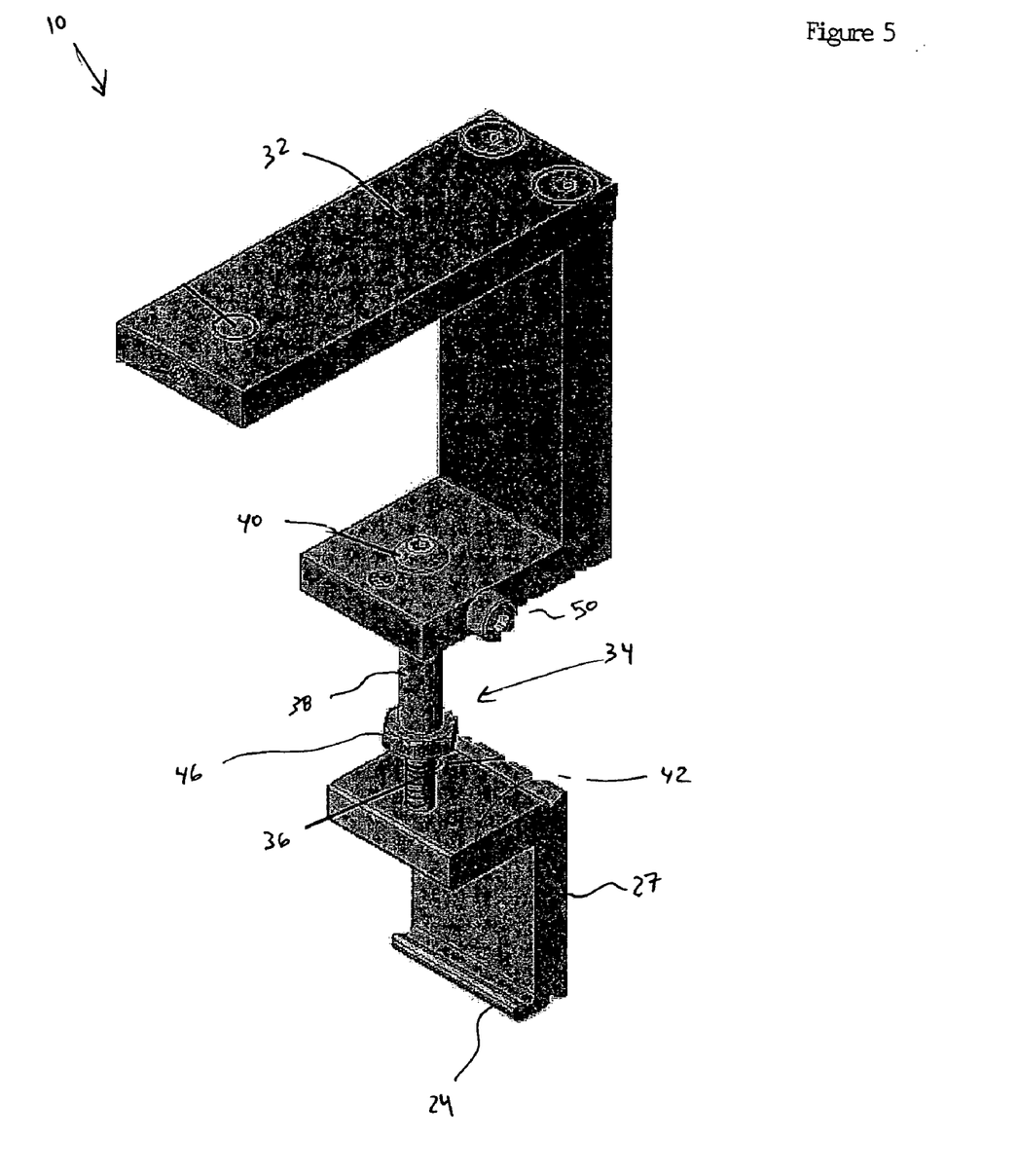
FIG. 5 is a perspective view of a hanger tool of an exemplary embodiment of the present invention.

Mounting plate 32 may take on alternate shapes. For example, when mounting the hanger tool 10 onto a mill having a knee 52 with square ways 53, as illustrated in FIG. 4, mounting plate 32 may take on a C-shape or bracket-shape, as illustrated in FIG. 5, e.g., in order to provide clearance for the square ways.

Figure 6:
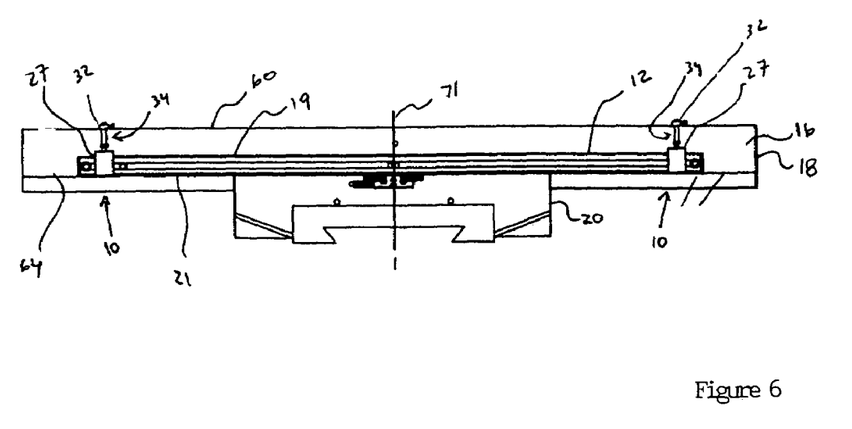
FIG. 6 is an elevational view of the hanger tools and linear encoder mounted on a mill table.
Figure 7:
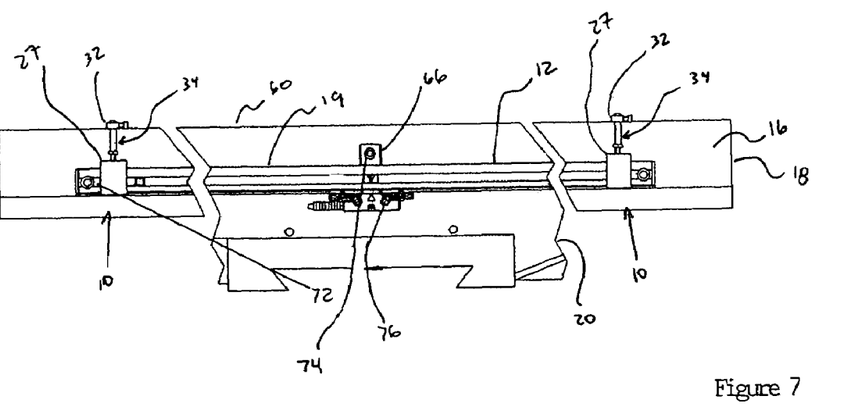
FIG. 7 is an enlarged view of the hanger tool and linear encoder illustrated in FIG. 6 with a connector element connected to a center of the linear encoder.
Figure 8:
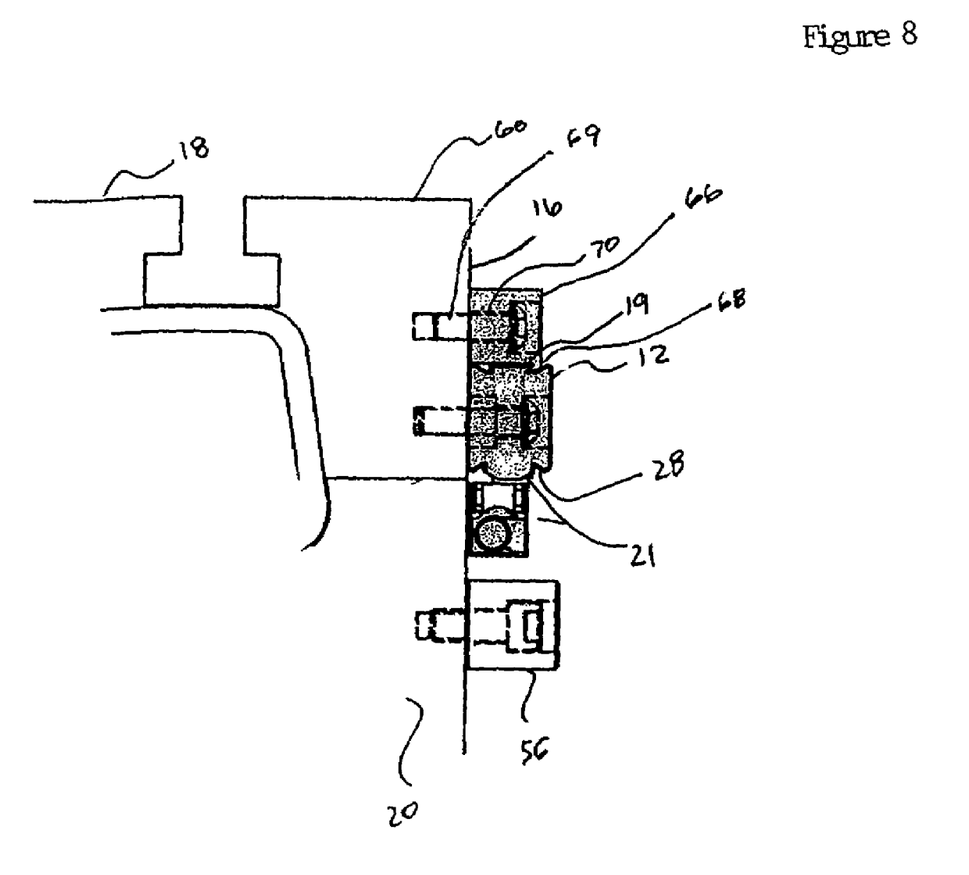
FIG. 8 is a cross-sectional view of a portion of the mill table, linear encoder and saddle taken along the centerline of the linear encoder after final installation of the linear encoder.

Prior to using the hanger tool 10, a reading head 54 may be centered on the encoder 12, the mill table 18 maybe moved to its center of travel, and the saddle 20 may be moved completely forward on the knee 52. Further, a saddle stop 56 may be secured to saddle 20, for example, approximately ½ inch down from a top edge of the saddle 20. As illustrated in FIG. 6, each hanger tool 10 may be placed on the mill 14 such that the mounting plate 32 firmly contacts a working surface 60 of the mill table 18 and the encoder 12, connected to the hanger tool 10, contacts a side 16 of the mill table 18. The working surface 60 may be a machine surface of the mill table 18, i.e., a surface that is true to axes, e.g., x- and y-axes, of the mill table 18. The mounting plate 32 is secured to the working surface 60 of the mill table 18 by magnet 37. The mounting plate 32 may be rotated into position so that the magnet 37 is located in correspondence to the surface of the working surface 60 rather than located above one of the T-slots in the mill table 18. The encoder 12 may be centered on the side 16 of the mill table 18. Each connector 34 may be height adjusted such that the underside 21 of the encoder 12 is flush with an underside 64 of the mill table 18. At one end of the encoder 12, for example, the left side, the height of the connector 34 may be locked in place by tightening lock nut 46. A measuring device, such as depth micrometer or dial indicator, may be used to measure a distance from working surface 60 of the mill table 18 to the top 19 of the encoder 12 adjacent the connector 22 on the left side of the encoder 12. Using this measurement, a height of the connector 34, for example, at the right end of the encoder 12 may be adjusted to within, for example, 0.010 inches. The height of this connector 34 may also be locked by tightening lock nut 46. Next, the position of each mounting plate 32 may be locked relative to the connector 34 by tightening each third screw 50. Next, a center support 66 may be positioned at a center of the encoder 12, as illustrated in FIG. 7. As illustrated in FIG. 8, the center support 66 engages a groove 68 on the top 19 of the encoder 12 and is secured to the side 16 of the mill table 18 by a threaded member 70.

FIG. 8 is a cross-sectional view of a portion of the mill table 18, a portion of the saddle 20 and the encoder 12 taken along center line 71 illustrated in FIG. 6 upon completion of installation and removal of the hanger tools 10. The position of encoder mounting holes 72 and center support mounting hole 74 may be marked by transfer punching the side 62 of the mill table 18, and the position of the read head mounting hole 76 may be marked, for example, by transfer punching the side of the saddle 20. The encoder mounting holes 72 may be marked first, next the center support mounting holes 74 may be marked, and then the reading head mounting holes 76 may be marked. Next, the hanger tools 10 and encoder 12 may be removed from the mill table 18 assembled as a single unit, and the mounting holes 72, 74, 76 may be drilled and tapped. Encoder mounting holes 72 may be drilled, for example, ¼-20×½ inch deep, and the reading head mounting holes 74 may be drilled, for example, 8-32×½ inch deep. Next, the hanger tools 10 and encoder 12 may be placed back on the mill table 18 such that the mounting holes 72, 74, 76 align with the holes so drilled and tapped in the mill table 18 and saddle 20. The encoder 12 may be secured to the mill table 18 by screw(s), bolt(s), etc., and the reading head may be secured to the saddle 20 by screw(s), bolt(s), etc. Next, one of the hanger tools 10 may be removed and locked onto the encoder 12 toward the center of the encoder 12. The center support 66 may then be secured to the mill table 18 using, for example, a threaded member 69, such as a bolt or screw. With the encoder 12 properly positioned and firmly secured to the mill table 18 each locking set screw 30 may be loosened, and the hanger tools 10 removed from the encoder 12 and the mill table 18. Thus, the mounting holes for mounting the encoder 12 are marked and machined in the machine tool based on the actual locations of those mounting holes on the encoder rather than based on a template as described, for example, in U.S. Pat. No. 6,820,348 and U.S. Patent Application Publication No. 2005/0028394.

Figure 9:
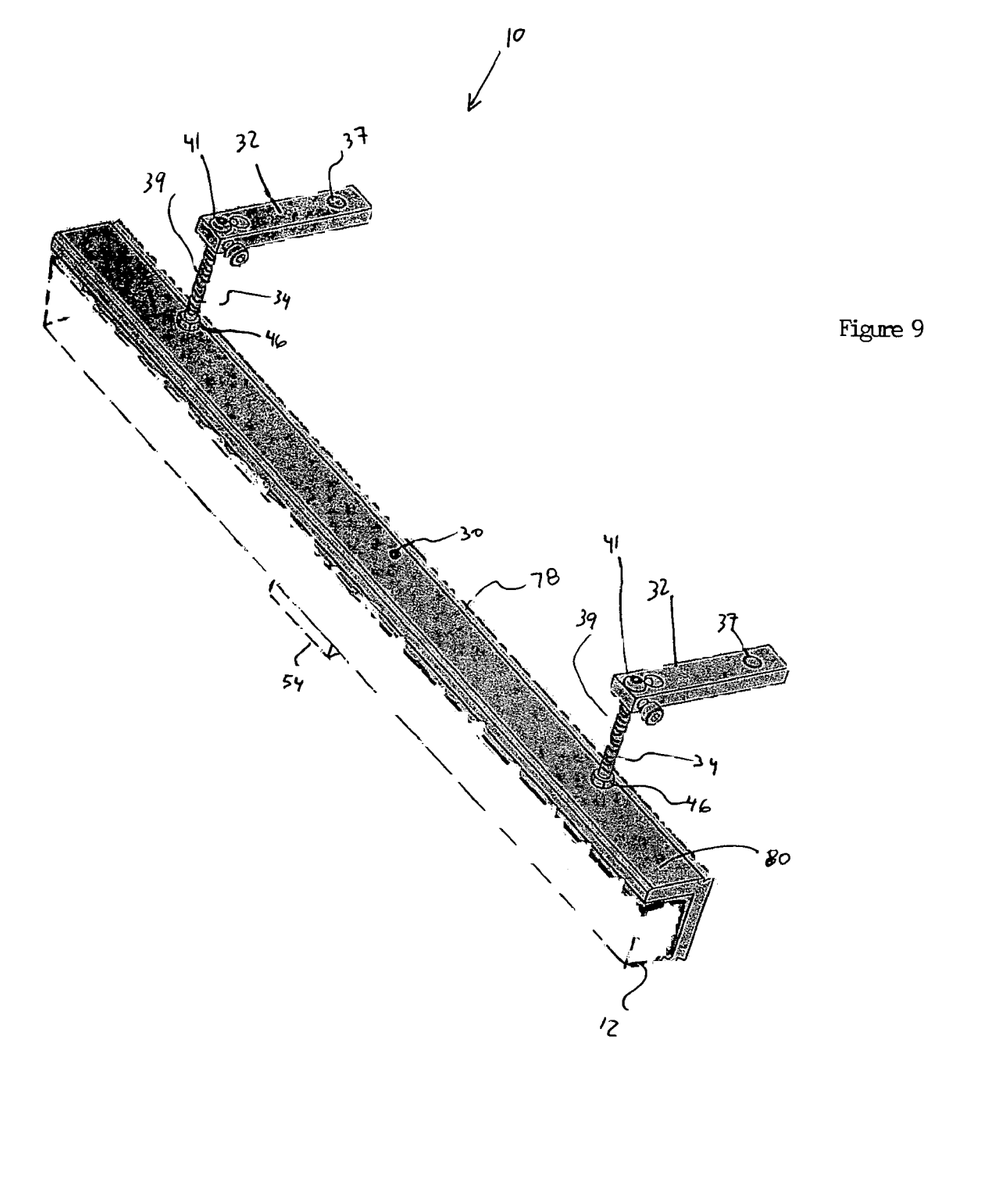
FIG. 9 is a perspective view of a hanger tool of an exemplary embodiment of the present invention connected to a spar, with a position measuring device illustrated in phantom.
Figure 10:
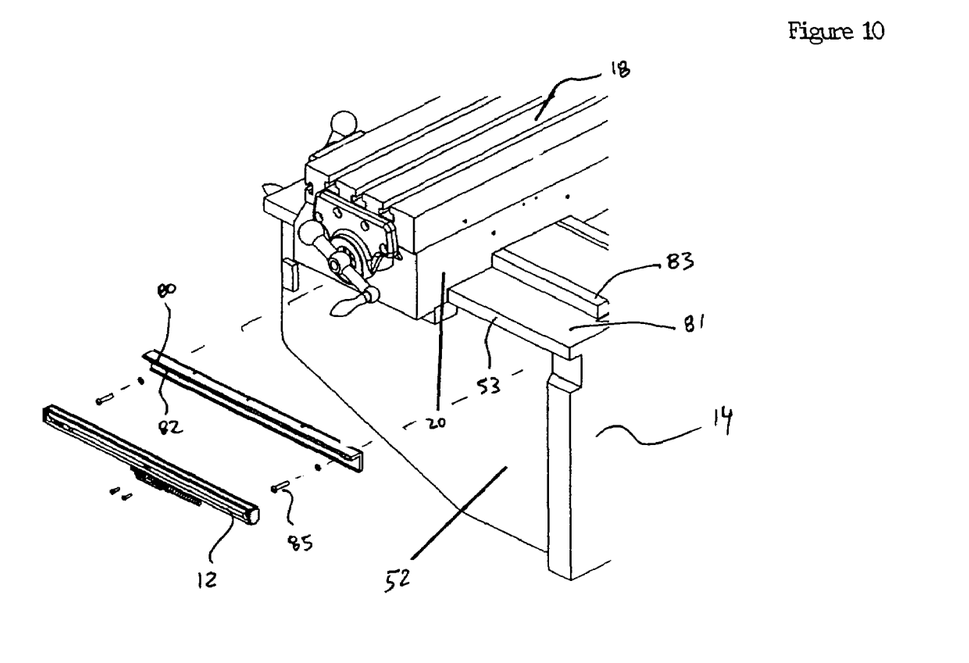
FIG. 10 is a perspective view of a linear encoder, spar and a mill with a saddle having a knee with square ways.
Figure 11:
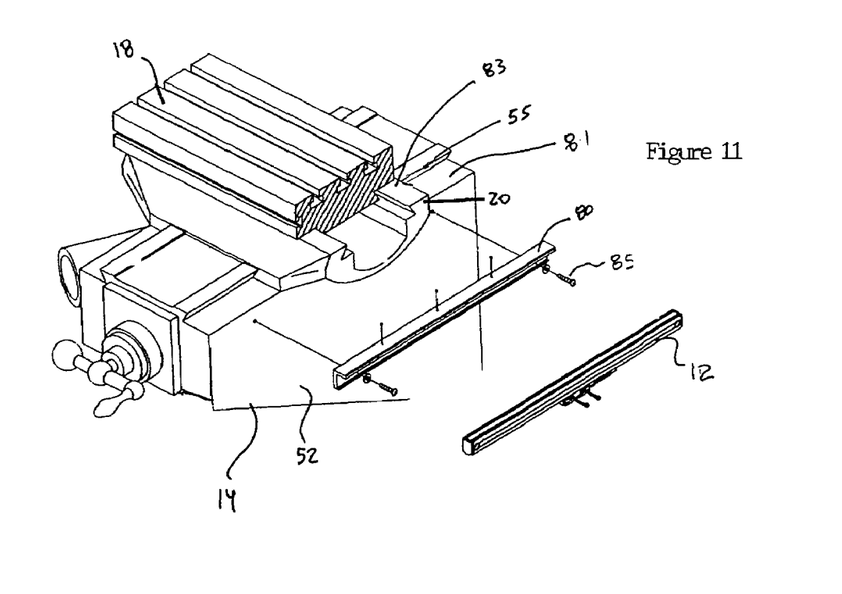
FIG. 11 is a perspective view of a linear encoder, spar and a mill with a saddle having a knee with dovetail ways.

A hanger tool 10, as illustrated in FIG. 9, may be used to mount a mounting bracket, such as a spar 78, along a cross feed direction or y-axis of a machine tool, such as mill 14. FIG. 10 illustrates the mounting position of the spar 78 on a mill table 14 with a knee 52 having square ways 53. FIG. 11 illustrates the mounting position of the spar 78 on the mill table 14 with a knee 52 having dovetail ways 55. The encoder 12 is connected to the spar 78 and secured using locking set screw 30 only after spar 78 is secured to the mill 14 using hanger tool 10. Similar to the hanger tool 10 of FIG. 1, hanger tool 10 includes a height adjustable connector 34 and a mounting plate 32 including a removable magnet 37. Instead of first screw 36 and internally threaded sleeve 38, as used in hanger tool 10 illustrated in FIG. 1, the height adjustable connector 34 includes a single headed threaded member, such as bolt 39, and a lock nut 46. Bolt 39 passes through a hole in the mounting plate 32 and screws into an internally threaded hole in the spar 78. A head 41 of the bolt 39 is larger than the hole in the mounting plate 32 through which bolt 39 passes preventing bolt 39 from falling through the hole when the hanger tool 10 is mounted on the mill 14. Tightening each lock nut 46 against the spar 78 locks the connector 34 to the spar 78.

When the hanger tools 10 are mounted on the mill 14, each mounting plate 32 firmly rests on surface 81 and the spar 78 contacts the saddle 20. The connectors 34 are height adjusted by rotating bolt 39 with, for example, a screwdriver or an allen wrench, to roughly position a top 80 of the spar 78 to a distance, for example, within 0.010 inches of each other from a top surface 83 of the ways 53, 55. The installation then follows the steps described above in reference to the hanger tool 10 illustrated in FIG. 1 except that a center support 66 is not used. The spar 78 is secured to the knee 52, for example, by a threaded member 85 such as a screw or bolt, which passes through spar mounting holes 82. A standoff element, such as a washer, may be placed between the spar 78 and the mill 14 so as space the spar 78 a predetermined distance away from the mill 14. After securing the spar 78, the hanger tools 10 are removed from the spar 78 by unscrewing bolt 39 from the spar 78. At which point, the encoder 12 may be connected to the spar 78 so as to complete the installation.

What is claimed is:

1. A device for mounting a position measuring device onto a machine tool, comprising:
    at least one hanger tool including:
        a bracket detachably attachable to a housing of the position measuring device;
        a mounting plate detachably attachable to a machine surface of the machine tool, the mounting plate rotatable relative to the bracket; and
        an adjustment device adapted to adjust a distance between the bracket and the mounting plate.

2. The device according to claim 1, wherein the mounting plate is at least partially magnetized.

3. The device according to claim 1, wherein the position measuring device includes a linear encoder.

4. The device according to claim 1, further comprising a securing device adapted to secure the bracket to the housing of the position measuring device.

5. The device according to claim 1, wherein the mounting plate is disposed at an angle to a longitudinal axis of the adjustment device.

6. The device according to claim 1, wherein the bracket includes a first threaded member and the adjustment device includes a second threaded member engageable with the first threaded member, relative rotation of the first threaded member and the second threaded member adjusting the distance between the bracket and the mounting plate.

7. The device according to claim 6, wherein the first threaded member is externally threaded and the second threaded member is internally threaded.

8. The device according to claim 6, wherein the second threaded member is externally threaded and the first threaded member is internally threaded.

9. The device according to claim 6, wherein the second threaded member is rotatable received in a bore in the mounting plate.

10. The device according to claim 9, wherein the mounting plate includes a lock screw adapted to lock the second threaded member against rotation relative to the mounting plate.

11. The device according to claim 1, wherein the at least one hanger tool includes two hanger tools, the bracket of each hanger tool detachably attachable to the housing of the position measuring device at a respective end of the position measuring device.

12. The device according to claim 1, wherein the hanger tool includes a lock screw adapted to fix the mounting plate in rotational position relative to the bracket.

13. A device for mounting a position measuring device onto a machine tool, comprising:
    a spar attachable to the machine tool and to the position measuring device; and
    at least one hanger tool including:
        a mounting plate detachably attachable to a machine surface of the machine tool, the mounting plate rotatable relative to the spar; and
        an adjustment device adapted to adjust a distance between the spar and the mounting plate.

14. The device according to claim 13, wherein the mounting plate is at least partially magnetized.

15. The device according to claim 13, wherein the position measuring device includes a linear encoder.

16. The device according to claim 13, wherein the spar includes a threaded hole corresponding to each hanger tool, the adjustment device including a threaded member engageable with the threaded hole, rotation of the threaded member relative to the threaded hole adjusting the distance between the spar and the mounting plate.

17. The device according to claim 16, wherein the threaded member is rotatable received in an unthreaded bore in the mounting plate.

18. The device according to claim 17, wherein the mounting plate includes a lock screw adapted to lock the threaded member against rotation relative to the mounting plate.

19. The device according to claim 13, wherein the at least one hanger tool includes two hanger tools.

20. The device according to claim 16, wherein the at least one hanger tool includes two hanger tools, the threaded holes located at each end of the spar.

21. The device according to claim 13, wherein the hanger tool includes a lock screw adapted to fix the mounting plate in rotational position relative to the spar.

22. A method for mounting a position measuring device onto a machine tool, comprising:
    (a) attaching a bracket of at least one hanger tool onto a housing of the position measuring device;
    (b) attaching a mounting plate of each hanger tool to a machine surface of the machine tool;
    (c) after the attaching step (a) and the attaching step (b), aligning an axis of the position measuring device to an axis of the machine tool by adjusting an adjustment device of the hanger tool;
    (d) after the aligning step (c), marking, on the machine tool, locations of mounting holes for the position measuring device;
    (e) after the marking step (d), removing the position measuring device and the hanger tool from the machine tool without detachment of the bracket from the housing of the position measuring device;
    (f) after the removing step (e), machining the mounting holes on the machine tool;
    (g) after the machining step (f), reattaching the position measuring device and the hanger tool attached to each other to the machine tool;
    (h) after the reattaching step (g), mounting the position measuring device to the machine tool by the mounting holes; and
    (i) after the mounting step (h), detaching the hanger tool from the housing of the position measuring device.

23. The method according to claim 22, wherein the mounting plate is at least partially magnetized.

24. The method according to claim 22, wherein the position measuring device includes a linear encoder.

25. The method according to claim 22, wherein the at least one hanger tool includes two hanger tools, the attaching step (a) including attaching the bracket of a respective one of the two hanger tools onto the housing of the position measuring device at each end of the position measuring device.

26. The method according to claim 22, wherein the attaching step (b) includes rotating the mounting plate relative to the bracket.

27. A method for mounting a position measuring device onto a machine tool, comprising:
(a) attaching at least one hanger tool onto a spar;
(b) attaching a mounting plate of each hanger tool to a machine surface of the machine tool;
(c) after the attaching step (a) and the attaching step (b), aligning an axis of the spar to an axis of the machine tool by adjusting an adjustment device of the hanger tool;
(d) after the aligning step (c), marking, on the machine tool, locations of mounting holes for the spar;
(e) after the marking step (d), removing the spar and the hanger tool from the machine tool without detachment of the hanger tool from the spar;
(f) after the removing step (e), machining the mounting holes on the machine tool;
(g) after the machining step (f), reattaching the spar and the hanger tool attached to each other to the machine tool;
(h) after the reattaching step (g), mounting the spar to the machine tool by the mounting holes;
(i) after the mounting step (h), detaching the hanger tool from the spar; and
(j) after the detaching step (i), attaching the position measuring device to the spar.

28. The method according to claim 27, wherein the mounting plate is at least partially magnetized.

29. The method according to claim 27, wherein the position measuring device includes a linear encoder.

30. The method according to claim 27, wherein the at least one hanger tool includes two hanger tools, the attaching step (a) including attaching a respective one of the two hanger tools onto the spar at each end of the spar.

31. The method according to claim 27, wherein the attaching step (b) includes rotating the mounting plate relative to the spar.

32. A system, comprising:
a position measuring device mountable onto a machine tool; and
a device adapted to mount the position measuring device onto the machine tool, the device including:
at least one hanger tool including:
a bracket detachably attachable to a housing of the position measuring device;
a mounting plate detachably attachable to a machine surface of the machine tool, the mounting plate rotatable relative to the bracket; and
an adjustment device adapted to adjust a distance between the bracket and the mounting plate.

33. The device according to claim 32, wherein the mounting plate is at least partially magnetized.

34. The device according to claim 32, wherein the position measuring device includes a linear encoder.

35. The device according to claim 32, wherein the at least one hanger tool includes two hanger tools, the bracket of each hanger tool detachably attachable to the housing of the position measuring device at a respective end of the position measuring device.

36. The system according to claim 32, wherein the hanger tool includes a lock screw adapted to fix the mounting plate in rotational position relative to the bracket.

37. A system, comprising:
a position measuring device;
a spar adapted to mount the position measuring device onto a machine tool; and
a device adapted to mount the spar onto the position measuring device, the device including:
at least one hanger tool including:
a mounting plate detachably attachable to a machine surface of the machine tool, the mounting plate rotatable relative to the spar; and
an adjustment device adapted to adjust a distance between the spar and the mounting plate.

38. The system according to claim 37, wherein the at least one hanger tool includes two hanger tools.

39. The system according to claim 37, wherein the hanger tool includes a lock screw adapted to fix the mounting plate in rotational position relative to the spar.

40. A system, comprising:
a position measuring device mountable onto a machine tool; and
a device adapted to mount the position measuring device onto the machine tool, the device including a pair of hanger tools, each hanger tool detachably attachable selectively along a length of the position measuring device, each hanger tool including:
a bracket detachably attachable to a housing of the position measuring device;
a mounting plate detachably attachable to a machine surface of the machine tool; and
an adjustment device adapted to adjust a distance between the bracket and the mounting plate.

41. The system according to claim 40, wherein the mounting plate is rotatable relative to the bracket.

42. The system according to claim 41, wherein the hanger tool includes a lock screw adapted to fix the mounting plate in rotational position relative to the bracket.

* * * * *